(12) United States Patent
Ku et al.

(10) Patent No.: US 6,462,762 B1
(45) Date of Patent: Oct. 8, 2002

(54) APPARATUS, METHOD, AND PROGRAM PRODUCT FOR FACILITATING NAVIGATION AMONG TREE NODES IN A TREE STRUCTURE

(75) Inventors: William Hsiao-Yu Ku; John Shih-Yuan Wang, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,699

(22) Filed: Aug. 5, 1999

(51) Int. Cl.⁷ ................................................. G06F 3/00
(52) U.S. Cl. ..................... 345/853; 345/841; 345/854; 345/855
(58) Field of Search ................................ 345/853, 854, 345/855, 835, 810, 841, 818, 819, 820, 817, 825, 828, 804

(56) References Cited

U.S. PATENT DOCUMENTS

| | | | | |
|---|---|---|---|---|
| 4,710,763 A | | 12/1987 | Franke | |
| 5,262,761 A | | 11/1993 | Scandura | |
| 5,276,789 A | * | 1/1994 | Besaw et al. | 345/440 |
| 5,515,487 A | * | 5/1996 | Beaudet et al. | 345/440 |
| 5,559,955 A | * | 9/1996 | Dev et al. | 714/4 |
| 5,786,820 A | | 7/1998 | Robertson | |
| 5,812,135 A | * | 9/1998 | Kotchey | 345/853 |
| 5,893,109 A | * | 4/1999 | Derose et al. | 707/104 |
| 6,040,834 A | * | 3/2000 | Jain et al. | 345/853 |
| 6,144,962 A | * | 11/2000 | Weinberg et al. | 707/10 |
| 6,219,053 B1 | * | 4/2001 | Tachibana et al. | 345/835 |
| 6,243,091 B1 | * | 6/2001 | Berstis | 345/839 |

* cited by examiner

Primary Examiner—Raymond J. Bayerl
Assistant Examiner—Cuong T. Thai
(74) Attorney, Agent, or Firm—David A. Mims, Jr., Esq.; Russell D. Culbertson, Esq.; Shaffer & Culbertson, LLP

(57) ABSTRACT

A particular node (24) in a tree structure (23) defined in a data processing system (10) may be selected for display as the root node in a tree structure display window (21). Once a particular node (24) is selected as the root node, only that portion of the tree structure branching from the selected node (24) is displayed. The portion of the tree structure (23) which does not branch from the selected node (24) is omitted from the display. In addition to the portion of the tree structure branching from the selected node (24), the system also displays a path map window (22) containing information about the portion of the tree structure omitted from the display. The path map window (22) may include a representation of the selected node (24) and a representation of each ancestor USA node for the selected node, all arranged in the order of the path from the actual root node to the selected node.

21 Claims, 4 Drawing Sheets

APPARATUS, METHOD, AND PROGRAM PRODUCT FOR FACILITATING NAVIGATION AMONG TREE NODES IN A TREE STRUCTURE

TECHNICAL FIELD OF THE INVENTION

This invention relates to data processing systems and in particular to graphical representations of data in such systems. More particularly, the invention relates to a tree structure graphical representation which facilitates navigation among the various nodes of the tree structure.

BACKGROUND OF THE INVENTION

Computer application programs and operating systems commonly include a user interface feature enabling users to view a listing of information stored on the computer. For example, the Windows 98™ operating system from Microsoft Corporation includes the Windows Explorer™ program to help the user keep track of files stored on resources associated with the computer. An effective arrangement for viewing lists of stored information is helpful if not necessary even in simple personal computer systems since such systems have the capacity to store thousands of files.

Large lists of files, directories, and other computer resources are much easier to understand when portrayed in a hierarchical fashion. A hierarchical representation is an effective method of listing computer resources because it groups related subject matter together in a manner that enables the user to locate desired items more easily. One way to represent a hierarchy is to use a tree structure. A tree structure includes a number of reference points called nodes that together make up a tree. The origin or base of a tree is called the root node, which is characterized by the fact that it has no parent node. Every other node has only one parent and potentially one or more children nodes. The leaf is the lowest node in the hierarchy of the tree structure and thus has no children nodes. This concept of a tree structure can be applied to many types of data or computer resource classifications. Regardless of the type of information portrayed in the tree structure, the nodes which trace along from a given node back through the hierarchy to the root node may be referred to as ancestor nodes for the given node. The series of ancestor nodes together with the given node may be referred to as a branch in the tree structure.

One example of a tree structure is a file system where related information is grouped together using a hierarchy of subdirectories. In this example, the main or root directory is the root node of the tree, and a number of subdirectories to the main directory represent children nodes to the main directory. Each subdirectory can be broken into a number of other subdirectories to achieve additional layers of hierarchy. At the lowest level of the file system hierarchy, a number of files may represent leaf nodes of the tree structure. In addition to directories of files, the concept of the tree structure can be extended to groupings of other types of data.

While using a tree structure is an effective way to represent complex information stored in a computer, it is important for users to be able to readily browse through displayed information. Complex tree structures are common in current computer systems, especially considering the growing memory capacity of the typical personal computers. Computer network applications add further complexity because of the vast amount of data that can be distributed across a network of computers.

Network database applications in particular require an effective user interface to represent database resources distributed across a network of computers. In a typical network database configuration, it is common to have a large number of server database applications distributed throughout the computer network. Each server database application in the network can be associated with a very complex hierarchy of information. In such complex systems, it is very difficult for users to locate desired information without an effective user interface to view and navigate through the complex hierarchy of information.

A text based user interface can be used to navigate through information stored in a hierarchical tree structure, but such user interfaces are limited. These text-based user interfaces do not convey to the user any information about the overall hierarchy because they can only display a flat listing of one level of the hierarchy at a time. Unless the user can remember where items are located in the data structure, he or she must repeatedly page through levels of the hierarchy before finding the proper path to a desired item.

User interfaces displaying a graphical representation of the tree structure offer a more effective interface than the text-based approach. The Windows Explorer™ interface, for example, graphically displays the hierarchy of a file system. This interface allows the user to view several layers of hierarchy at once, and also enables the user to interactively expand nodes in the tree structure. Selecting and clicking on a parent node using a mouse or other user input device modifies the display of the tree structure to show the child nodes of the selected parent node.

However, graphical user interfaces such as the Windows Explorer™ feature in the Windows 98™ operating system do not provide an effective interface for very large and complex tree structures such as those typically encountered in network database applications. The problem arises from the limited space on a monitor display associated with the computer. Complex tree structures may simply require more room than is available on a particular display. Thus, the user can only see a portion of the total complex tree structure at any given time. In order to view other areas of the tree structure, the user must use the scroll features commonly included in the display arrangement. A user may scroll one direction to follow a branch of the tree structure out to the files representing the leaf nodes, and then scroll back the opposite direction to locate another branch and follow it out to its respective leaf nodes.

SUMMARY OF THE INVENTION

It is an object of the invention to provide a method, apparatus, and program product for facilitating navigation among tree nodes in a complex tree structure graphically displayed on a monitor associated with a data processing system.

The invention allows a user to select a particular node for display as the root node. Once a particular node is selected as the root node, only that portion of the tree structure branching from the selected node is displayed on the monitor. That is, once a particular node is selected as the root node, a truncated tree structure is displayed showing the selected node as the root node, with the portion of the tree structure not branching from the selected node being omitted from the display. In addition to the portion of the tree structure branching from the selected node, the system also displays a path map containing information about the portion of the tree structure omitted from the display. The preferred path map shows a representation of the selected node and a representation of each ancestor node for the selected node, all arranged in the order of the path from the actual root node to the selected node. This graphical presentation comprising a selected portion of the total tree structure may show the desired portion of the tree structure in normal scale with normal detail and yet eliminate the need to scroll through the tree structure to find the desired node or information. The path map display allows the user to navigate easily back through the omitted portion of the tree structure.

The method of the invention includes displaying the selected portion of a total tree structure in one window on the monitor and the path map in another window both in response to a use-as-root-node input. The selected portion of the total tree structure includes the selected node and the portion of the total tree structure branching from the selected node. The path map is preferably built from an ancestor node list produced in response to the use-as-root-node input.

In the preferred form of the invention, the use-as-root-node command may be selected from a node menu which is displayed on the monitor. The method includes displaying the node menu in response to a node menu input which the user may provide in a number of ways. For example, the user may provide the node menu input by positioning a pointer over a displayed node with a pointer control device such as a mouse and then clicking or double-clicking a mouse button. Alternatively, the node menu may be accessed from a menu bar display. The node menu may comprise a pop-up menu or a pull-down menu listing the use-as-root-node command either alone or with other commands unrelated to the present invention.

These and other objects, advantages, and features of the invention will be apparent from the following description of the preferred embodiments, considered along with the accompanying drawings.

DESCRIPTION OF THE PREFERRED EMBODIMENTS

Figure 1:
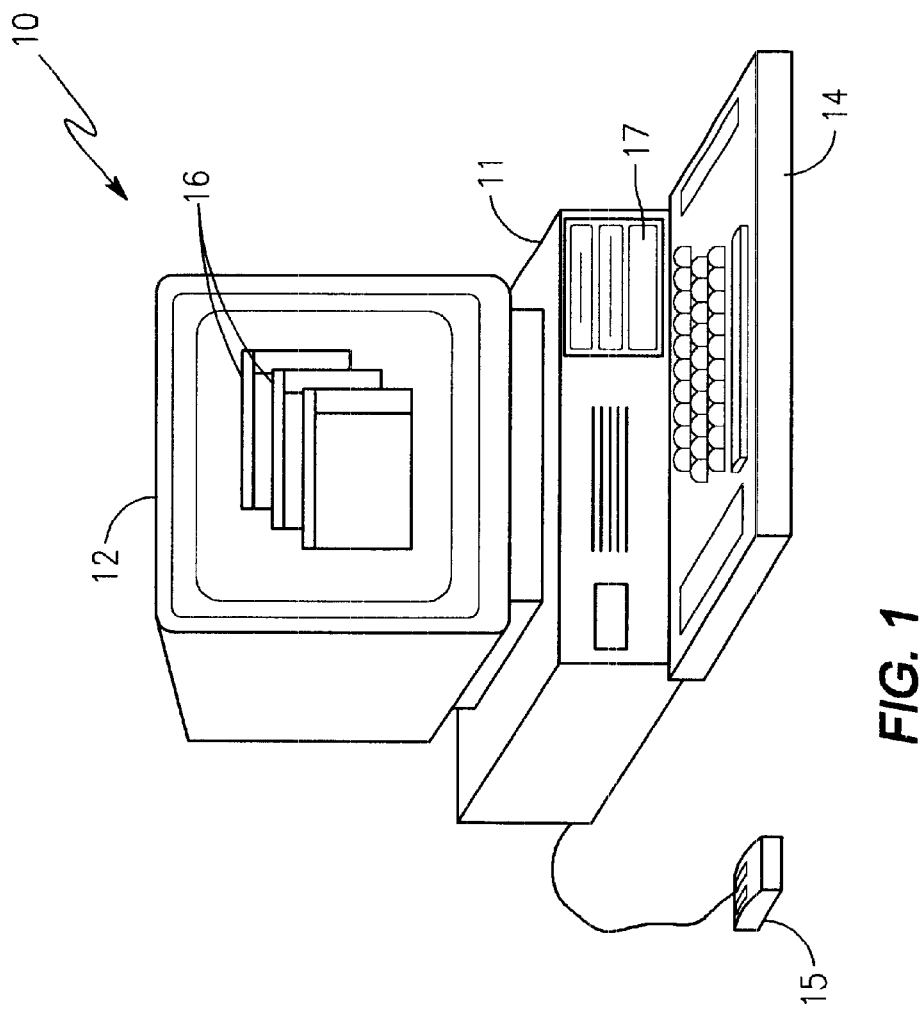
FIG. 1 is a representational view in perspective showing a computer system through which a tree structure navigation arrangement embodying the principles of the invention may be implemented.

The invention is implemented in a data processing system, such as a personal computer system 10 shown in FIG. 1. Although the invention will be described in this disclosure with reference generally to the personal computer 10, those skilled in the art will appreciate that the invention may be implemented in other data processing environments, all and is not limited to the personal computer application. For example, the tree structure navigation arrangement according to the invention may be implemented in a distributed computing network or a system using smart terminals.

Personal computer 10 includes a housing 11 which houses major components of the system such as a microprocessor and random access memory (not shown). Housing 11 may also house a mass memory device or drive 17. Personal computer 10 also includes a monitor 12 and one or more user input devices such as keyboard 14 and mouse 15. The user input devices 14 and 15 provide means by which a user may enter data into the system, enter commands directly, or move a cursor or pointer within a graphical user interface displayed on the monitor 12. Monitor 12 displays various screens or windows 16 associated with the operating system running on the personal computer or with one or more applications being executed by the personal computer 10. These windows 16 may each comprise or include a graphical user interface. In some network environments, monitor 12 may also display windows associated with applications being executed on another computer system in communication with personal computer 10.

It will be appreciated that personal computer 10 and the associated devices 12, 14, and 15 shown in FIG. 1 are shown only for purposes of example. The invention is not intended to be limited to the particular illustrated devices. For example, a personal computer system or other data processing system through which the invention may be implemented may include different types of user input devices such as trackballs, touch pads, touch sensitive screens, and other user input devices. Furthermore, a data processing system within the scope of the invention may include more than a single monitor such as monitor 12. All of these alternative user input devices and other related data processing equipment should be considered equivalent to the user input devices and associated equipment described in this disclosure and set forth in the following claims.

Personal computer 10 operates under the control of an operating system such as the OS/2™, Windows™, or MacIntosh™ operating system. One or more programs may be executed on computer 10. The programs generally include displays which are presented in one or more of the windows 16 displayed on monitor 12 under the control of the operating system utilized by computer 10.

Generally, the operating system and the computer programs operating on personal computer 10 are tangibly embodied in a computer readable medium, for example, one or more fixed and/or removable data storage devices such as device 17 shown in FIG. 1. Both the operating system and the computer programs may be loaded from the data storage device 17 into the random access memory associated with computer 10 for execution by the processor (not shown) associated with the computer. Both the operating system and computer programs comprise program instructions or code which, when read and executed by the processor of computer 10, cause the computer to perform the steps necessary to execute the steps or elements of the present invention. Thus, unless otherwise indicated, the steps set out in the flow charts described below comprise steps performed by the hardware associated with the computer 10 under software control. The apparatus or arrangements for performing the steps or functions performed according to the invention and set out in the claims each comprise this computer hardware operating under software or program code control. The software program code or instructions are stored on a medium which is readable by computer system 10 such as a floppy disk, fixed disk, or other memory storage device associated with the system (for example, mass storage 17 shown in FIG. 1).

Figure 2:
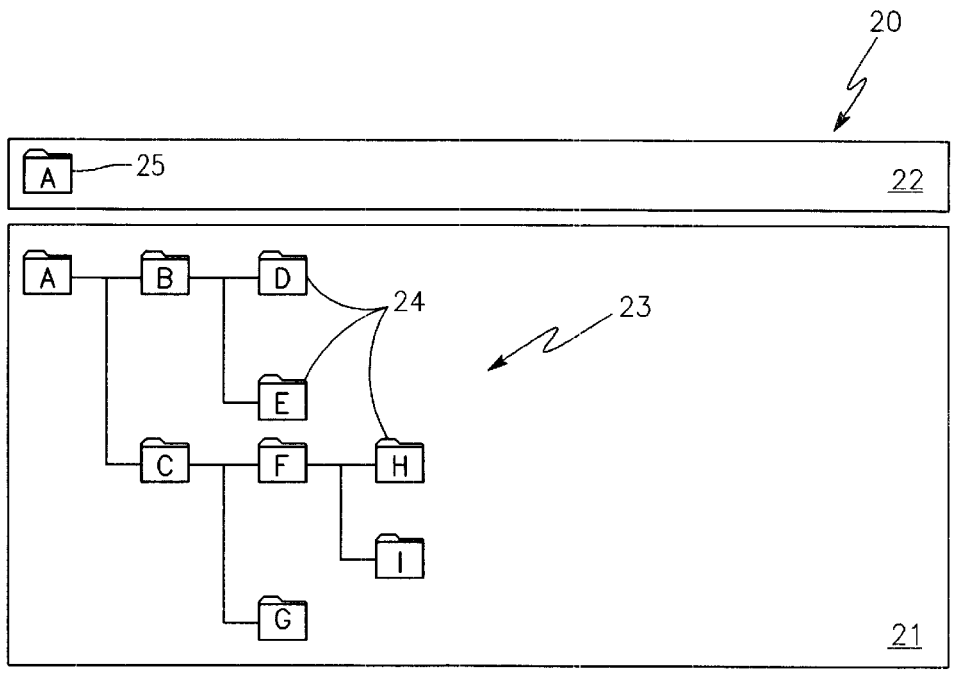
FIG. 2 is a representation of a screen display embodying the principles of the invention.

Referring to FIG. 2 a screen display 20 according to the invention includes a tree structure display window 21 and a path map window 22. Tree structure display window 21 shows a desired portion of a tree structure 23 including a plurality of nodes 24 starting from a selected node. The default selected node preferably comprises the actual root node, shown as node A in FIG. 2. In the illustrated example tree structure 23, nodes B and C are children nodes of node A. Also, node B has children nodes D and E, while node C has children nodes F and G. Node F has children nodes H and I.

Path map window 22 displays a representation 25 of the node currently selected for display as the root node in window 21, and also displays a representation 26 of each ancestor node for that selected node. Since node A is the actual root node in the illustrated form of the invention, path map window 22 in FIG. 2 includes only a representation 25 of node A.

In the preferred form of the invention, tree structure display window 21 and path map window 22 each comprise a separate window displayed on the monitor associated with the data processing system through which the invention is implemented (monitor 12 in FIG. 1 for example). Those skilled in the art will appreciate that the desired tree structure and path map may alternatively be displayed in different areas of a common window. This single window form of the invention is to be considered an equivalent to the dual window arrangement described specifically in this disclosure.

In both the tree structure display window 21 and path map window 22, each node 24 is preferably indicated by graphical representation or icon. In the FIG. 2 and the following screen display figures, the representation 24 comprises a file folder icon which is a representation commonly used for a directory or subdirectory in a data structure. These file folder icons are shown only for purposes of illustration and the nodes displayed according to the invention may be displayed using any other type of graphical representation. The graphical representations may even be different among the various nodes. Alternatively to or in addition to the graphical representation, each node 24 may be indicated by a text-based or other identifier such as a file name or directory/subdirectory name. This identifier may be positioned on the graphical representation generally in the position of the reference letters A through I shown in FIG. 2, for example, or may be positioned adjacent to the graphical representation. Graphical representations 25 and 26 appearing in map path window 22 may similarly include or be replaced by text-based identifiers.

It will be appreciated that tree structure 23 shown for purposes of example in FIG. 2 is a very simple structure compared to data structures commonly encountered in current personal computer systems and computer networks. This simple tree structure is sufficient for illustrating and describing the elements and features of the present invention but is not intended to limit the invention.

The tree structure display arrangement and method according to the invention may be included as a feature of an operating system, and may be invoked directly through the operating system or invoked through an application executing on the system.

Alternatively, a tree structure display arrangement within the scope of the invention may be included directly in an application program for viewing data structures pertinent to the particular application program. The invention described in this disclosure and the accompanying claims encompasses both operating system and application implementations along with equivalent implementations.

Figure 3:
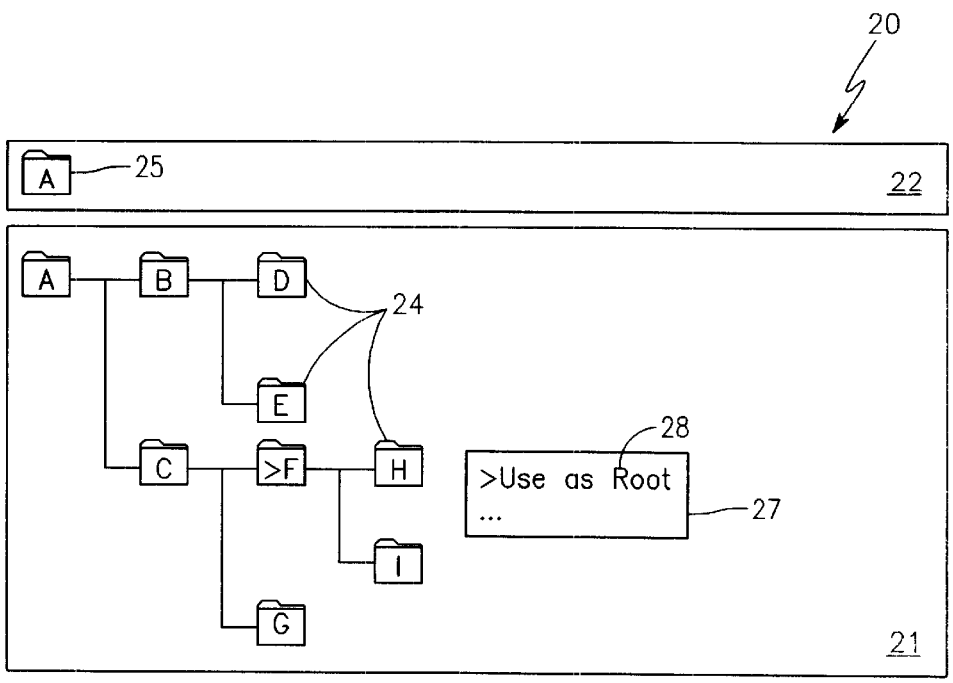
FIG. 3 is a representation of a screen display similar to FIG. 2 but with the node menu displayed.

Referring to FIG. 3, the invention preferably includes the step of displaying a node menu 27. This step may be performed in response to a node menu input to the data processing system. The node menu input may be generated in response to the user first selecting a desired node, such as node F in FIG. 3, and then invoking the selection. For example, node F may be selected by the user positioning a pointer over the node F icon using a pointer control device such has a mouse or trackball. The user may then invoke the selection by clicking, double-clicking, or otherwise activating a button or switch associated with the mouse or trackball device. For purposes of this disclosure and the accompanying claims, selecting and invoking the selection to produce an input will be referred to simply as "selecting" or a "selection." A selection is indicated in the figures by the symbol ">" as shown in FIG. 3 at node F for example. It will be appreciated that the ">" symbol may not actually appear on the screen display. Also a selection may be alternatively indicated on the screen display by changing the particular graphical representation or command such as by highlighting the selected representation or command.

Node menu 27 includes at least the use-as-root-node command 28. The menu may include other commands represented by the ellipse symbols in the figures. These other commands which may be included in node menu 27 are not pertinent to the present invention and will not be described in this disclosure.

The illustrated form of the invention produces node menu 27 as a pop-up menu. Alternatively, the node menu may comprise a pull-down menu which may be accessed by selecting a menu bar item, such has the "View" item commonly included in the menu bar associated with most application programs designed for the Windows 98™ operating system. This pull-down menu alternative is to be considered equivalent to the pop-up menu 27 shown in the figures. Also, the use-as-root-node function may alternatively be selected through an icon displayed on the system monitor (such as monitor 12 in FIG. 1). This direct selection through an icon is to be considered equivalent to selection through the menu command 28 described in this disclosure.

Figure 4:
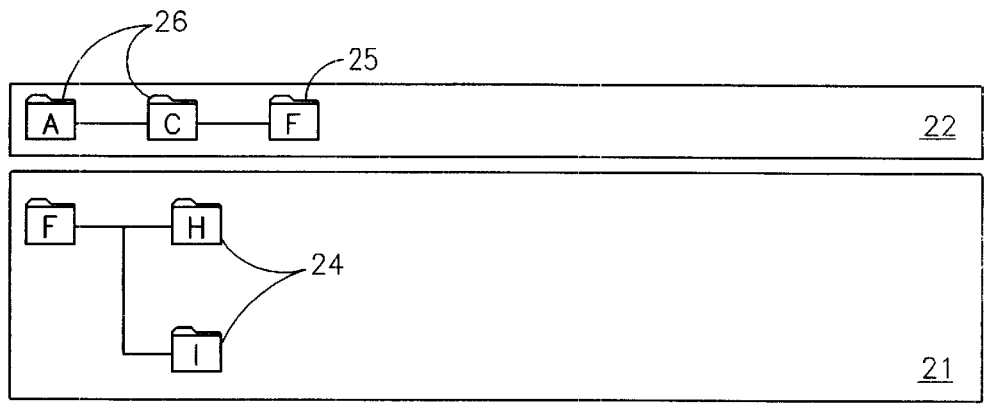
FIG. 4 is a representation of a screen display after selecting node F for use as the root node according to the invention.

FIG. 4 shows a display according to the invention resulting from the selection of node F for use as the root node as shown in FIG. 3. Selecting the use-as-root-node command 28 with node F selected activates node command program code to produce a useas-root-node input to the data processing system. This input identifies the selected node and initiates the display process described below with particular reference to FIG. 7.

In response to the use-as-root-node input, a tree display arrangement implemented through tree display program code executed on the data processing system (10 in FIG. 1) changes tree structure display window 21 as shown in FIG. 4 so that node F is considered the root node. Thus, tree structure display window 21 shows a truncated tree structure including only the portion of total tree structure comprising the branch starting with node F. A path map arrangement comprising path map program code executing on the data processing system responds to the use-as-root-node input to change path map window 22 to display a representation 25 for node F and a representation 26 for each ancestor node of node F, nodes A and C. The nodes displayed in path map window 22 are shown in order of the path from the actual root node (node A) to the selected node (node C). It will be noted that representation 25 for node F in path map window 22 is a separate representation for node F shown in addition to the representation shown in the truncated tree structure in tree structure display window 21.

In the preferred form of the invention, the display includes a single tree structure display window 21 and a single path map window 22. That is, selecting the use-as-root-node command such as by selecting node F as shown in FIG. 3, causes the currently open windows 21 and 22 to be updated or rewritten with the information shown in FIG. 4. However, in an alternate form of the invention, selecting the use-as-root-node command 28 causes the system to open a new tree structure display window and a new path map window over the currently existing windows 21 and 22. This alternate form of the invention is to be considered equivalent to the rewritten or updated window implementation of the invention.

Figure 5:
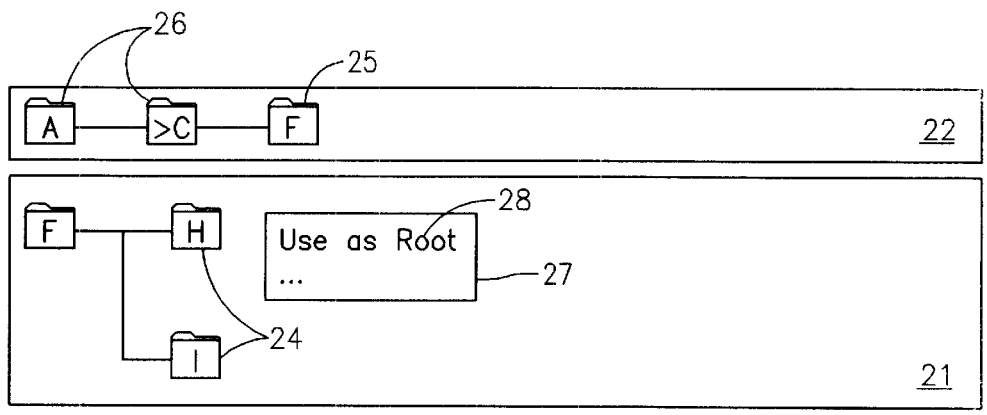
FIG. 5 is a representation of a screen display similar to FIG. 4 but showing the node menu.

FIG. 5 may be used to describe the steps performed by the user to navigate from the display shown in FIG. 4 to the tree structure from node C. To produce the node menu input, the user selects the node C representation 26 from path map 22. The node menu arrangement included in the preferred form of the invention responds to the node menu input by displaying pop-up node menu 27. With node C selected, the user next selects the use-as-root-node command 28 from node menu 27 to prompt the node command arrangement to produce the use-as-root-node input.

Figure 6:
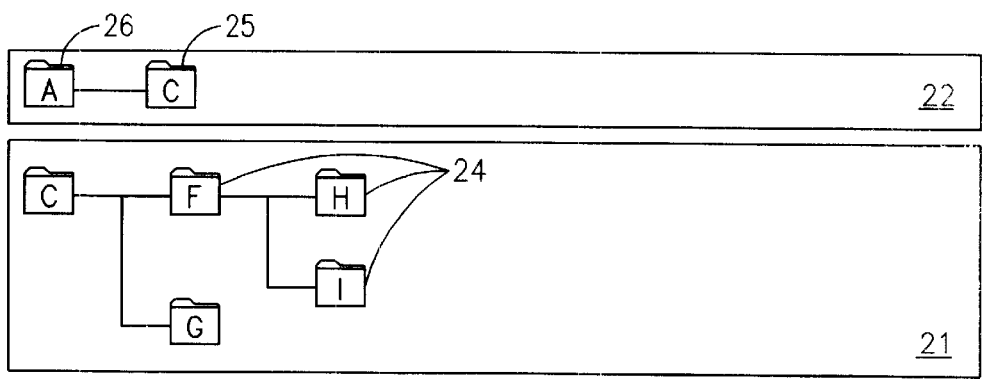
FIG. 6 is a representation of a screen display in which node C from FIG. 5 has been selected as the root node according to the invention.

The tree display arrangement implemented in the data processing system through tree display program code responds to the use-as-root-node input by changing the portion of the tree structure shown in tree display window 21 as shown in FIG. 6. With node C selected as the root node, the portion of the total tree structure shown in window 21 comprises node C and each of the nodes which depend from node C, in this case nodes F, G, H, and I. The path map arrangement responds to the use-as-root-node input by changing the path map window 22 to show a representation 25 for node C and a representation 26 for each ancestor node to node C, only node A in this example.

To display a desired portion of a tree structure according to the invention, a user simply identifies a node in the branch to be displayed and selects that node to display as the root node, preferably by using the use-as-root-node command. Once a selected portion of the tree structure is displayed in tree display window 21, the user may move to another adjacent branch by selecting an ancestor node 26 from the path map window 22 to identify a node at the start of that adjacent branch. For example, assume the user wishes to navigate from the display shown in FIG. 6 to show the tree structure from node B. In this case, the user first selects node A as the root node. This selection results in a display as in FIG. 2 and shows the branch beginning with node B. The user may then select node B and the use-as-root-node command. The resulting use-as-root-node input causes the system to produce a tree display window (not shown) including node B as if it were the root node, and children nodes D and E. The resulting path map window (not shown) would include the selected node, node B, and its sole ancestor node, node A.

Figure 7:
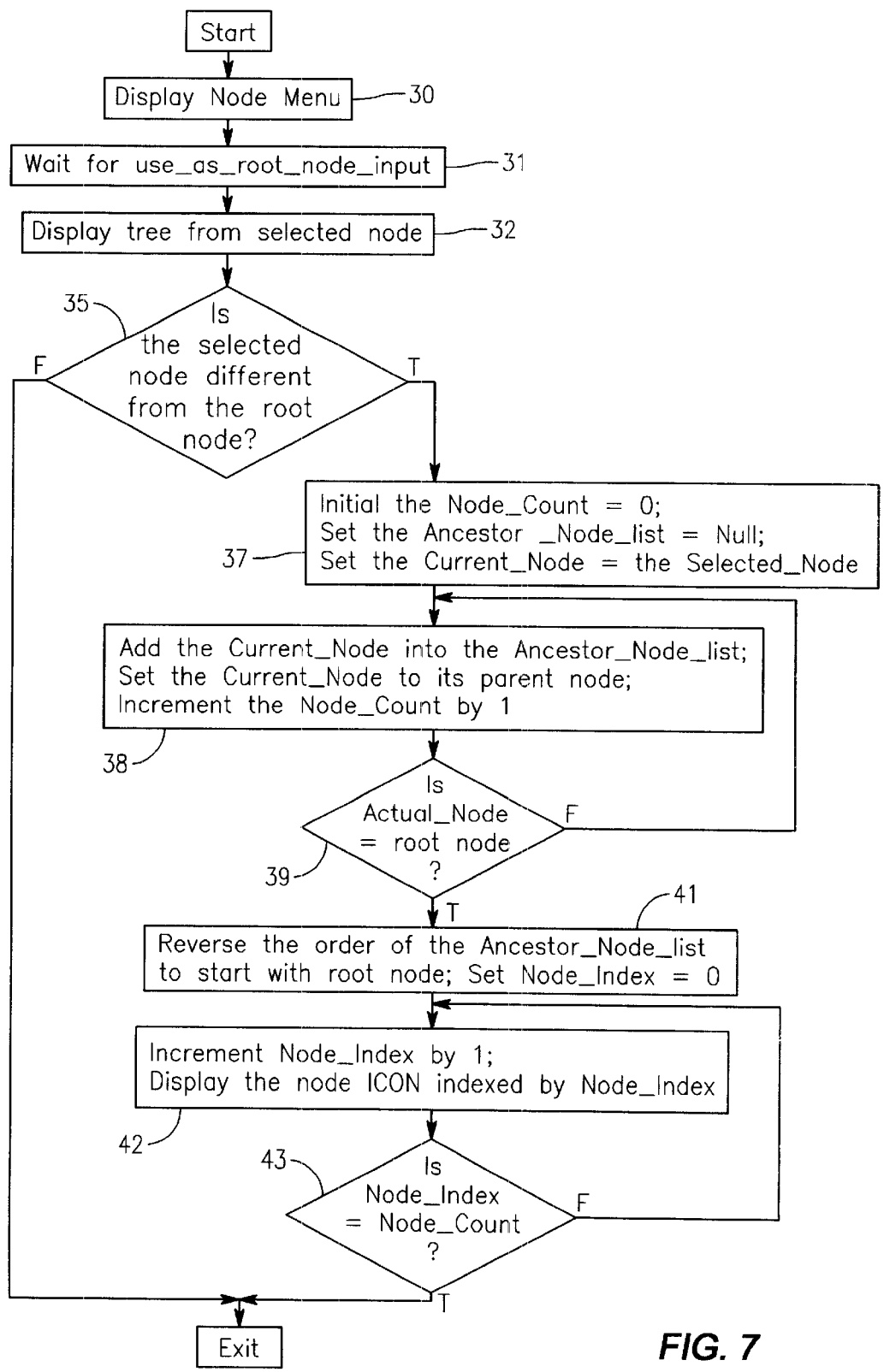
FIG. 7 is a flow chart showing a tree structure display process embodying the principles of invention.

FIG. 7 comprises a flow chart showing the preferred process for implementing the invention. The data processing system may first provide a display according to the prior art or otherwise showing an entire tree structure or some predefined portion of the entire tree structure. The invention may then be invoked to navigate within the tree structure.

In the preferred form of the invention, the node menu display arrangement responds to a node menu input to display node menu 27 on the system monitor (12 in FIG. 1) as shown at process block 30. This node menu input may be made by selecting a particular node displayed on the monitor and then providing a suitable input using a mouse or other user input device as discussed above with reference to FIG. 3. Once node menu 27 is displayed, the system waits at process block 31 for the user to provide a use-as-root-node input. This input is preferably made by identifying a node displayed on the monitor 12 (the selected node) and then selecting the use-as-root-node command 28 from node menu 27. In response to the use-as-root-node input, the tree display arrangement displays in tree display window 21 that portion of the total tree structure beginning from the selected node. This display step simply modifies the current display in window 21 to remove all nodes which are ancestor nodes to the selected node or which depend from ancestor nodes to the selected node.

The remainder of the process shown in FIG. 7 involves producing or rebuilding the path map window 22 shown in FIGS. 2 through 6. As shown at decision block 35 in FIG. 7, the process includes determining if the selected node is the same as the root node. If the selected node is the root node, the process simply terminates because the display does not have to the updated. However, if the selected node is different from the root node the process branches to steps 37, 38, and 39 to produce an ancestor node list beginning with the selected node and including each ancestor node from the selected node back to the actual root node of the data structure being viewed.

At process step of 37, the system initializes a Node_Count value to zero, sets an Ancestor_Node_List to null, and sets a Current_Node value equal to the selected node. At process block 38, the system adds the Current_Node to the Ancestor_Node_List, sets the Current_Node equal to the next node back in the hierarchy (the next parent node), and increments the Node_Count value by one. At decision block 39, if the Current_Node equals the actual root node, the Ancestor_Node_List is complete in the process can move to the next series of steps. However, if the Current_Node is not equal the actual root node at decision block 39, then the process loops back to step 38.

Once the Ancestor_Node_List is complete, the method of the invention includes placing the node representations or icons for the ancestor nodes and the selected node in a desired order and then displays the representations in the path map window 22 in that order. As shown at step 41 in FIG. 7 the invention first reverses the order of the Ancestor_Node_List and sets a Node_Index value to zero. Reversing the order of the list produces a list beginning with the actual root node for the total tree structure and ending with the selected node. At process block 42, the system increments the Node_Index value by one and displays the node icon or representation for the next node in the list produced at step 41, indexed by the Node_Index value. If the Node_Index value as determined at decision block 43 is equal to the Node_Count then all nodes in the Ancestor_Node_List have been displayed and the process terminates. However, if the Node_Index value is not equal to the Node_Count, then the process loops back to step 42 to increment the Node_Index value and display the next node representation in the reversed list.

The above described preferred embodiments are intended to illustrate the principles of the invention, but not to limit the scope of the invention. Various other embodiments and modifications to these preferred embodiments may be made by those skilled in the art without departing from the scope of the following claims. For example the screen displays and command name described above and shown in the figures are given only as examples in order to describe the invention. Numerous other display styles and command names may be employed within the scope of the following claims.

What is claimed is:

1. A method for facilitating navigation among tree nodes in a tree structure representing a hierarchical organization of data in a data processing system, the method comprising the steps of:
   (a) displaying a selected portion of a total tree structure in response to a use-as-root-node input identifying a selected node which comprises a child node in the total tree structure, the selected portion of the total tree structure being displayed on a monitor associated with the processing system and comprising a truncated tree structure showing the selected node and that portion of the total tree structure branching from the selected node; and
   (b) displaying a path map on the monitor in response to the use-as-root-node input, the path map being displayed simultaneously with the selected portion of the total tree structure and including an additional representation for the selected node, and a separate representation for each ancestor node of the selected node.

2. The method of claim 1 further including the step of:
   (a) displaying a node menu on the monitor in response to a node menu input, the node menu including a use-as-root-node command.

3. The method of claim 2 wherein the node menu comprises a pop-up menu.

4. The method of claim 2 wherein the node menu comprises a drop-down menu.

5. The method of claim 2 further including the step of producing the use-as-root-node input in response to a selection of the use-as-root-node command from the node menu.

6. The method of claim 1 wherein the method of displaying the path map includes the steps of:
   (a) adding each respective ancestor node to an ancestor node list; and
   (b) comparing each respective ancestor node for the selected node to the root node.

7. The method of claim 1 wherein the representation for each respective ancestor node comprises a different icon and the representation for the selected node comprises a selected node icon.

8. An apparatus for facilitating navigation among tree nodes in a tree structure representing a hierarchical organization of data in a data processing system, the apparatus comprising:
   (a) a tree display arrangement for displaying on a monitor a selected portion of a total tree structure in response to a use-as-root-node input identifying a selected node which comprises a child node in the total tree structure, the selected portion of the total tree structure comprising a truncated tree structure showing the selected node and that portion of the total tree structure branching from the selected node; and
   (b) a path map arrangement for displaying a path map on the monitor in response to the use-as-root-node input, the path map being displayed simultaneously with the selected portion of the total tree structure and including an additional representation for the selected node, and a separate representation for each ancestor node of the selected node.

9. The apparatus of claim 8 further including:
   (a) a node menu display arrangement for displaying a node menu on the monitor in response to a node menu input, the node menu including a use-as-root-node command.

10. The apparatus of claim 9 wherein the node menu comprises a pop-up menu.

11. The apparatus of claim 9 wherein the node menu comprises a drop-down menu.

12. The apparatus of claim 9 further including a node command input arrangement for producing the use-as-root-node input in response to a selection of the use-as-root-node command from the node menu.

13. The apparatus of claim 8 wherein the path map arrangement includes:
   (a) an ancestor node listing arrangement for adding each respective ancestor node of the selected node to an ancestor node list; and
   (b) an ancestor node comparing arrangement for comparing each respective ancestor node for the selected node to the root node.

14. The apparatus of claim 8 wherein the representation for each respective ancestor node comprises a different icon and the representation for the selected node comprises a selected node icon.

15. A computer program product for facilitating navigation among tree nodes in a tree structure representing a hierarchical organization of data in a data processing system, the computer program product comprising computer readable program code stored on a computer readable storage medium and including:
   (a) tree display program code for causing a monitor to display a selected portion of a total tree structure in response to a use-as-root-node input identifying a selected node which comprises a child node in the total tree structure, the selected portion of the total tree structure comprising a truncated tree structure showing the selected node and that portion of the total tree structure branching from the selected node; and
   (b) path map program code for causing the monitor to display a path map in response to the use-as-root-node input, the path map being displayed simultaneously with the selected portion of the total tree structure and including an additional representation for the selected node, and a separate representation for each ancestor node of the selected node.

16. The program product of claim 15 further including:
   (a) node menu display program code for displaying a node menu on the monitor in response to a node menu input, the node menu including a use-as-root-node command.

17. The program product of claim 16 wherein the node menu comprises a pop-up menu.

18. The program product of claim 16 wherein the node menu comprises a drop-down menu.

19. The program product of claim 16 further including:
   (a) node command input program code for producing the use-as-root-node input in response to a selection of the use-as-root-node command from the node menu.

20. The program product of claim 15 wherein the path map program code includes:
   (a) ancestor node listing program code for adding each respective ancestor node to an ancestor node list; and
   (b) ancestor node comparing program code for comparing each respective ancestor node for the selected node to the root node.

21. The program product of claim 15 wherein the representation for each respective ancestor node comprises a different icon and the representation for the selected node comprises a selected node icon.

* * * * *